US011479332B2

(12) United States Patent
Søvik

(10) Patent No.: US 11,479,332 B2
(45) Date of Patent: Oct. 25, 2022

(54) TRANSPORT SYSTEM AND METHOD

(71) Applicant: Vard Electro AS, Tennfjord (NO)

(72) Inventor: Christian Søvik, Søvik (NO)

(73) Assignee: Vard Electro AS, Tennfjord (NO)

( * ) Notice: Subject to any disclaimer, the term of this patent is extended or adjusted under 35 U.S.C. 154(b) by 774 days.

(21) Appl. No.: 16/347,452

(22) PCT Filed: Nov. 2, 2017

(86) PCT No.: PCT/NO2017/050281
§ 371 (c)(1),
(2) Date: May 3, 2019

(87) PCT Pub. No.: WO2018/084716
PCT Pub. Date: May 11, 2018

(65) Prior Publication Data
US 2019/0276127 A1    Sep. 12, 2019

(30) Foreign Application Priority Data

Nov. 4, 2016   (NO) .................................. 20161753

(51) Int. Cl.
*H02J 7/00*       (2006.01)
*B63H 21/17*      (2006.01)
(Continued)

(52) U.S. Cl.
CPC ............ *B63H 21/17* (2013.01); *B63B 27/16* (2013.01); *B63B 35/54* (2013.01); *B63J 3/00* (2013.01); *H02J 7/0027* (2013.01); *H02J 7/0045* (2013.01)

(58) Field of Classification Search
USPC .......................... 320/106, 107, 108, 109, 110
See application file for complete search history.

(56) References Cited

U.S. PATENT DOCUMENTS 5,775,866 A * 7/1998 Tax ...................... B66C 19/002
                                                   414/141.4
2017/0012430 A1* 1/2017 Gillett ..................... H02J 3/381

FOREIGN PATENT DOCUMENTS

CN     101857066 A  * 10/2010  ............. B63H 21/17
CN     102180143 A  *  9/2011  ............... B60S 5/06
(Continued)

OTHER PUBLICATIONS

International Search Report for PCT Application No. PCT/NO2017/050281, dated Feb. 6, 2018 in 2 pages.
(Continued)

*Primary Examiner* — Brian Ngo
(74) *Attorney, Agent, or Firm* — Knobbe, Martens, Olson & Bear, LLP

(57) ABSTRACT

A transport system (10) comprising a seagoing vessel (14) with a battery room (18) for at least one swappable battery pack (19) for providing power for at least propulsion of the vessel (14), at least two battery packs (19), of which at least one battery pack is arranged on the vessel (14) when the vessel is in operation, a charging station (23) for charging the battery packs (19), which charging station (23) is located outside the vessel (14), such that the vessel (14) can be positioned close to the charging station (23) for transfer of one or more battery packs (19) between the vessel (14) and the charging station (23), and a transfer device (31) for transferring the battery packs (19) back and forth between the vessel (14) and the charging station (23) when the vessel is positioned close to the charging station (23).

24 Claims, 14 Drawing Sheets

(51) Int. Cl.
*B63B 27/16* (2006.01)
*B63B 35/54* (2006.01)
*B63J 3/00* (2006.01)

(56) References Cited

FOREIGN PATENT DOCUMENTS

| | | | | | |
|---|---|---|---|---|---|
| CN | 205355184 U | * | 6/2016 | | |
| DE | 24 44 711 A1 | | 4/1976 | | |
| DE | 2444711 A1 | * | 4/1976 | | |
| KR | 20140139160 A | | 12/2014 | | |
| NL | 2001854 C | | 1/2010 | | |
| WO | 2011/153849 A1 | | 12/2011 | | |
| WO | WO-2014144928 A1 | * | 9/2014 | ............. | B22D 31/00 |

OTHER PUBLICATIONS

Norwegian Search Report for Application No. 20161753, dated Jan. 23, 2018 in 2 pages.

* cited by examiner

TRANSPORT SYSTEM AND METHOD

CROSS-REFERENCE TO RELATED APPLICATIONS

This application is the U.S. National Phase under 35. U.S.C. § 371 of International Application PCT/NO2017/050281, filed Nov. 2, 2017, which claims priority to Norwegian Patent Application No. 20161753, filed Nov. 4, 2016. The disclosures of the above-described applications are hereby incorporated by reference in their entirety.

FIELD OF THE INVENTION

The present invention relates to a transport system comprising an electrically powered vessel equipped with a least one swappable and rechargeable battery pack.

BACKGROUND

Vessels, such as ferries, fishing vessels, cruise ships and other types of maritime vessels have conventionally been equipped with motors that run on fossil fuel such as diesel oil, diesel or other types of fossil fuels. Combustion of fossil fuel results in the emission of $CO_2$ and other pollutants. Diesel-electric and/or gas-electric propulsion systems have for a number of years been a preferred propulsion system in many applications, but recently, against a backdrop of climate change, the use of batteries has been implemented in order to optimise, reduce or eliminate $CO_2$ and other pollutant emissions.

For example, a ferry has been put into trial operation in Western Norway, which ferry has been provided with electric motors that use electric power supplied by a battery pack located in the vessel. The ferry that is in trial operation is equipped with a battery pack that is permanently installed below deck in the ferry. To get the battery pack to last all day, the ferry's battery pack is connected to a charging station at the different ferry terminals, or at least one of some of the ferry terminals, at which the ferry docks. The ferry usually lies alongside the quay for about 10 minutes. The vessel's battery pack is therefore connected as quickly as possible to the charging station on the quay, and is charged as much as possible in the short time the ferry remains alongside the quay. This involves a very high charging current, which places a heavy demand on the power grid that is to supply the charging current; moreover, the high charging current results in great stress on the battery pack. The actual connection of the cable from the charging station on the quay facility to the electric contact on the vessel that is connected to the battery in the bottom of the vessel is also a weak element in this system since problems with the connection result in delays in or, at worst, cancellation of the operation of the vessel until the problem has been solved. Furthermore, even with very high charging current and a large, heavy battery pack installed, it is not possible to charge the battery pack fully in this short time, and the battery pack gradually discharges throughout the day until it is almost depleted at the end of the day. This ferry does not therefore manage to run a full 24 hours without having to be taken out of operation for an extended battery pack charging period. The solution to this problem could have been to increase the charging current further, but this would require even more of the infrastructure around the power supply, which perhaps would not be feasible, especially in smaller places. The alternative would be to use a larger battery pack in the vessel, but this would result in greater weight, require more space in the vessel and lead to increased costs.

It is an object of the present invention to provide transport systems and methods which reduce or eliminate the above-mentioned challenges, and/or provide other advantages over known solutions and techniques, for example to enable near-continuous operation of an electrically powered vessel.

SUMMARY

In an embodiment, there is provided a transport system with a vessel comprising at least one swappable battery pack that supplies electric power to one or more electric motors for at least propulsion of the transport means, and also comprises a charging station for charging the at least one battery pack, and a transfer device for transferring at least the at least one battery back between the charging station and the battery room on the vessel.

In an embodiment, there is provided a method for near-continuous operation of an electrically powered vessel with the aid of such a transport system.

BRIEF DESCRIPTION OF THE DRAWINGS

Illustrative, non-limiting embodiments of the present invention will be described below with reference to the appended drawings, in which.

DETAILED DESCRIPTION

Figure 1:
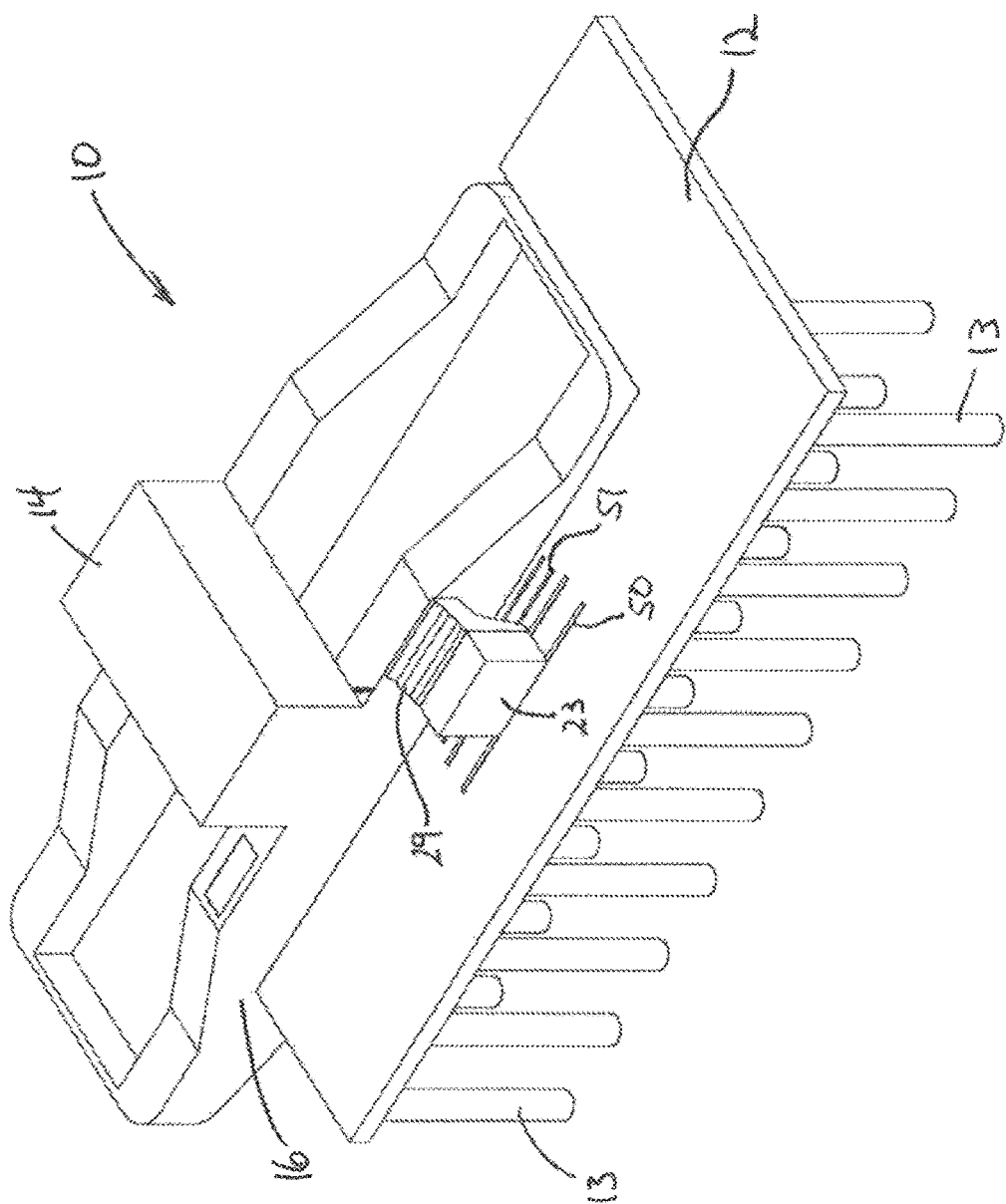
FIG. 1 is a perspective view of a first embodiment of a transport system, where the transfer device is covered with a weather-protecting curtain.

According to an embodiment, there is provided a transport system comprising:

a seagoing vessel comprising a battery room for at least one swappable battery pack for providing power for at least propulsion of the vessel;

at least two battery packs, of which at least one battery pack is arranged in the vessel when the vessel is in operation;

a charging station for charging the battery packs, which charging station is located outside the vessel, but such that the vessel can be positioned close to the charging station for transfer of one or more battery packs between the vessel and the charging station; and a transfer device for transfer of the battery packs back and forth between the vessel and the charging station when the vessel is positioned close to the charging station.

The vessel referred to here may be a large, seagoing vessel such as, for example, a ferry, a cruise ship, a cargo vessel or another type of vessel of similar or larger size, and the battery packs involved are typically non-portable by a person, i.e., the weight of a single battery pack is so great that it would not be possible for a person to handle a battery pack on their own. The weight and size of the battery packs mean that they must be handled, i.e., lifted/lowered and moved, by mechanical equipment of some type or other. The design of the battery packs may be such that the battery pack comprises a single battery or a plurality of batteries that are coupled together into a battery pack.

The charging station preferably comprises at least one charging bay for securely holding a battery pack in the charging station, the at least one charging bay being provided with an electric contact element that is electrically connected to a power supply for charging a battery pack that is placed in the charging bay. The charging station can advantageously be equipped with two or more charging bays, each one being adapted to a battery pack.

The at least one charging bay and the battery packs are preferably configured with cooperating electric contact elements such that a battery pack is connected electrically to the power supply when the battery pack is placed in the at least one charging bay.

The transport system may comprise a plurality of charging stations that are located at a corresponding number of ports of call for the vessel, and the transport system can further comprise at least a plurality of battery packs, such that there is at least one battery pack in each charging station and at least one battery pack on the vessel.

The vessel may also be adapted for use of two or more battery packs, and at the same time the charging stations may be provided with one or more battery packs for charging. The vessel can thus be powered by a plurality of battery packs and either all can be changed at the same time when they approach a discharged state, or one battery pack at a time can be changed such that the vessel has battery packs with varying degrees of charge.

The vessel's battery room preferably comprises at least one battery bay for securely holding a battery pack in the battery room, the at least one battery bay being provided with an electric contact element that is electrically connected to at least the vessel's electric motor or motors. Battery bays are preferably given a configuration adapted to the configuration of the battery packs such that a battery pack is held securely in a given position in the at least one battery bay. The at least one battery bay and the at least one charging bay can also be provided with fasteners that cooperate with fasteners in or on the battery packs, for example, bolts and corresponding holes or openings, or other suitable fastening devices capable of holding a battery pack securely in a battery bay or charging bay. The fasteners are preferably so configured that they can be opened and closed with the aid of one or more hydraulic or preferably electric actuators. The actuator or actuators will preferably be controlled by a control system having a GPS system such that they can be actuated a short time before the vessel comes alongside a charging station, thereby ensuring that the at least one battery pack is ready to be transferred to the charging station when the vessel docks alongside the charging station.

The at least one battery bay in the battery room and the battery packs are preferably provided with cooperating electric contact elements such that a battery pack is connected electrically to at least the vessel's electric motor or motors, and usually also the rest of the vessel's electric system, when the battery pack is placed in the at least one battery bay.

The vessel further preferably comprises a battery room hatch for opening and closing the battery room, the battery room hatch, when open, allowing access to the battery room for changing a battery pack. The battery room is preferably located in the vessel in such a way that the battery room hatch can be arranged in the vertical hull side of the vessel, thereby obtaining access to the battery room through the hull side of the vessel facing the charging station. It is possible, however, to place battery room and battery hatch in other positions as described below. The battery room hatch is opened and closed preferably automatically using a power-operated opening and closing device, which device is preferably controlled by a control system equipped with a GPS system, normally the same control system as mentioned above, such that the battery room hatch can be opened a short time before the vessel comes alongside a charging station.

The charging station and/or transfer unit can be movably supported, for example, on a quay facility, in at least in one direction in the horizontal plane. This direction will preferably be essentially parallel to the quay facility on which the charging station is arranged such that the charging station and/or transfer unit can be moved back and forth along the hull side of the vessel, thereby adjusting the position of the charging station and/or transfer unit in relation to the vessel's battery room before a battery pack is transferred between battery room and charging station, or vice versa. To facilitate the transfer of battery packs between battery room and charging station, the battery room's at least one battery bay, the transfer unit and the charging station's at least one charging bay can be provided with wheels or roller conveyors on which the battery packs can be rolled.

In an embodiment, the transfer device comprises a frame and a support plate mounted on the frame, which frame comprises a movement mechanism adapted to move the battery support plate at least up and down and sideways in both directions between the charging station and the vessel's battery room. Thus, the support plate can be moved back and forth between the charging station and the battery room so as to allow a battery pack, or possibly multiple battery packs, to be moved from the charging station to the transfer device, and vice versa, and similarly from the battery room onto the transfer device, and vice versa.

The transfer device support plate is preferably motion compensated by means of the movement mechanism in order to compensate for the vessel's motions in the water and for varying water levels, for example, due to tides. To compensate for other motions in the water, for example, heave, pitch and rolling motions etc., use is preferably made of known sensors and known regulating methods, which are well known, for example, in the oil and gas industry, and this will therefore not be described in more detail here.

In another embodiment, the transfer device comprises a battery support plate for support of the at least one battery pack, where the battery support plate is mounted to the charging station and is movable in and out of the charging station towards the vessel's battery room when the vessel is lying at the charging station such that the at least one battery pack can be transferred back and forth between the charging station and the vessel's battery room. The battery support plate is, in other words, displaceable and can be displaced towards the vessel and away from the vessel when the vessel is lying at the charging station. The battery support plate can be mounted in a charging bay and moved between a position in which the battery support plate and a battery pack placed on the battery support plate are located in the charging bay and the battery pack is connected to the supply network so as to be able to receive a charging current. It is of course also possible to mount the battery support plate in the vessel's battery room such that the battery support plate, with one battery pack or several battery packs placed thereon, can be pushed back and forth between the charging station and the battery room when the vessel lies at the charging station and one or more battery packs are to be charged and/or one or more charged battery packs are to be placed in the vessel's battery room. The charging station is preferably movable relative to the vessel, on wheels or on rails in the longitudinal direction of the vessel, so as to allow the position of the battery support plate relative to the battery room to be adjusted to a desired position before the battery support plate is pushed out for transfer of one or more battery packs between the charging station and the battery room.

As mentioned above, the transfer device battery support plate and the vessel's battery room, optionally the charging station if the battery support plate is mounted in the battery room, can comprise wheels or a roller conveyor on which the at least one battery pack can roll. The transfer device battery support plate is preferably motion compensated in order to compensate for the vessel's motions in the water, such as heave, pitch and roll motions, and for varying water levels.

In a third embodiment, the transfer device comprises a battery gangboard extending from the charging station onto a deck on the vessel. The battery gangboard preferably extends to the vessel's battery room or to a battery room support plate that has been moved out of the battery room such that a battery pack can be wheeled straight onto the battery room support plate. In this case, the battery room is arranged to the side of the battery gangboard, and the battery room support plate is then, as described above, preferably mounted in the battery room and is movable out of the battery room towards the battery gangboard. The battery room can also be arranged in such a way on the vessel that it lies immediately towards the end of the battery gangboard so that a battery pack can be wheeled straight from the battery gangboard into the battery room, and vice versa. To move the battery gangboard onto the deck, it can be provided with wheels that roll on the deck. The battery gangboard can further be configured telescopically, especially if it must be moved some way inwards on the deck of the vessel. Alternatively, the battery gangboard can be in two pieces and part of the gangboard can be permanently mounted on the vessel. To adjust the battery gangboard relative to the battery room, the gangboard can be provided with one or more lifting devices or jack devices that adjust the height, i.e., lift the wheels or roller conveyor on which the battery packs roll relative to the deck. It is also possible to arrange the battery room in a vertical shaft extending down from the deck of the vessel. A battery pack can be moved across the battery gangboard and onto a battery support plate, which is lowered into the shaft and into the battery room. The battery room is closed as explained above, using a battery room hatch, preferably arranged uppermost in the shaft such that it is roughly flush with the deck of the vessel.

The battery gangboard can also comprise wheels or a roller conveyor on which a battery pack can roll. An advantage of this embodiment of the invention is that heave compensation can be avoided.

In a fourth embodiment, the charging station and the battery room are adapted such that the at least one battery pack is lowered into and lifted out of the charging station's at least one charging bay and the battery room's at least one battery bay. The transfer device preferably comprises a lifting device for lowering and lifting a battery pack into and out of the at least one charging bay and the at least one battery bay.

The transfer device can further comprise a movable lifting arm and at least one winch device to lift and lower a battery pack, which lifting arm is movably supported on the transfer device such that a battery pack can be moved from a position over the charging station's at least one charging bay to a position over the battery room's at least one battery bay, and vice versa. The at least one winch device preferably comprises a wire with a lifting hook or the like at the end which can be fastened to a fastening device on the battery packs, for example, a lifting eye or the like.

The transfer device preferably comprises a plurality of legs that are provided with wheels, the legs being adapted in such a way that the transfer device can be moved over the charging station and a battery pack can be lowered into and lifted out of the charging station's at least one charging bay, i.e., that the legs of the transfer device are adapted such that they straddle the charging station. The transfer device is preferably provided with wheels to enable it to be moved relative to the vessel when the vessel is lying at the charging station. Furthermore, the charging station's at least one charging bay preferably comprises a hatch for closing the at least one charging bay. The battery room's at least one battery bay preferably also comprises a hatch for closing the at least one battery bay.

As mentioned above, the at least one charging bay, the at least one battery bay and the support plate/battery support plate can comprise wheels or one or more roller conveyors on which the battery packs can be moved in both directions between the battery room and the charging station.

As an alternative, it is possible to provide the battery packs with a plurality of wheels arranged on the underside of the battery packs such that the battery packs can be rolled from the charging station's at least one charging bay onto the transfer device and from the transfer device into the battery room's at least one battery bay, and the other way from the at least one battery bay onto the transfer device and then into the at least one charging bay. The wheels can in that case be movable between an inoperative position in which they are retracted such that the at least one battery pack stands steady, and a moving position in which the wheels project from the at least one battery pack so that it can roll. If the battery packs are provided with wheels, the at least one charging bay, the at least one battery bay and the transfer device are preferably provided with at least one guiding device to guide the at least one battery pack's movement into the at least one charging bay, into the at least one battery bay and onto the transfer device. The guiding device can also be rails on which the wheels roll in the same way as a railway carriage rolls on rails.

The transport system described above further preferably comprises a control system with a control unit that communicates with the charging station, the transfer unit, the battery room and a GPS system so that the charging station and/or the transfer unit and/or the battery room can be prepared for changing the vessel's at least one battery pack as the vessel approaches the charging station. This allows time to be saved, which is important where a vessel, for example, a ferry, remains at the ferry terminal for a short time, perhaps only 10 minutes, before sailing on.

A method is further provided for near-continuous operation of an electrically powered vessel, the method comprising the following steps:
  providing a seagoing vessel comprising a battery room with space for at least one swappable battery pack;
  positioning the vessel close to a charging station for charging battery packs, the charging station having space for at least one battery pack;
  positioning a transfer device between the vessel's battery room and the charging station;
  transferring a depleted or partly depleted battery pack from the vessel's battery room to the charging station for charging, and/or transferring a charged battery pack from the charging station to the battery room for operation of the vessel.

One possible use of a transport system or a method as described above, is where the vessel is a ferry, or alternatively a cruise ship, cargo vessel or other types of ship that follow a regular route with fixed ports of call.

In the longer term, if a majority of all vessels are equipped with electric power and a standard battery pack design is achieved, a majority or all relevant ports of call for such sizable vessels can be equipped with a charging station for charging battery packs, and a vessel can thus go to the closest port of call that has a number, or the required number, of charged battery packs, and change its battery pack or packs there.

A number of further embodiments of a transport system are shown in the figures. For the sake of clarity, it should be mentioned that the same or similar technical features of the different embodiments are denoted by the same references numerals in all the figures.

Embodiments of the transport system 10, shown in the attached figures, comprise a vessel 14 which in the figures is shown lying alongside a quay 12 at which the vessel 14 has docked. A charging station 23 is arranged on the quay facility 12 for charging one or more battery packs used by the vessel 14 for at least propulsion of the vessel, but normally also for providing electric power to other electric devices on the vessel, such as instruments, lighting, heating etc.

The vessel 14 can be a large seagoing vessel such as, for example, a ferry, a cruise ship, a cargo vessel, or other type of vessel of similar or larger size, and the battery packs 19 involved here can be non-portable for a person, i.e., that the weight of an single battery pack 19 is so great that it would be impossible for a person to handle a battery pack on their own. The weight and size of the battery packs 19 mean that they must be handled, i.e., lifted/lowered and moved, by mechanical equipment of some kind or other.

The charging station 23 could be arranged at different locations where a vessel docks or in another way is connected to the charging station. For example, the charging station 23 could also be arranged on a mole, a pier, a floating device or other locations where the vessel can come alongside the charging station 23, and preferably be moored. A vessel 14 such as that shown in the figures, for example, a ferry, will normally have at least two locations in which it docks, for example, ferry terminals, but the vessel 14 may also have a route that involves it docking at a number of different locations. Each location, or a selection of locations, could then be equipped with a charging station 23 as required, thereby enabling the vessel 14 to run to and from all the locations continuously.

The charging station 23 comprises at least one charging bay 24 in which a battery pack 19 can be placed for charging. The charging station's at least one charging bay 24 and the battery packs 19 used are provided with cooperating electric contact elements such that when a battery pack is placed in the at least one charging bay 24, the cooperating electric coupling elements will automatically come into contact with each other, thereby enabling the battery pack 19 to be charged. The cooperating electric coupling elements can, for example, comprise plugs or spring elements of metal arranged in the at least one charging bay 24 and corresponding metal faces on the battery packs against which the spring elements are pressed when a battery pack 19 is placed in the at least one charging bay. To protect the metal faces or the plugs on the battery packs and prevent short circuiting, the battery packs can, in addition, be provided with a sliding, protective lid that covers the metal faces and that is pushed aside as the battery packs 19 are placed in the at least one charging bay 24. The spring elements or the plugs may of course be arranged on the battery packs 19, whilst the corresponding metal faces or the plugs can be arranged in the at least one charging bay 24, if so desired.

The vessel 14 is provided with one or more electric motors that are supplied with electric power from at least one battery pack 19. In this embodiment, the vessel further comprises at least one battery room 18 in which one or more battery packs 19 can be placed for providing electric current during operation of the vessel 14, both for powering the electric motors and for other devices on the vessel requiring electric current, for example, instruments, heating, lamps etc., but can also comprise several battery rooms 18 if necessary, for example, a battery room on each side of the vessel if the quay facilities 12 at which the vessel 14 docks are so configured that it is not possible to dock the vessel at all the quays 12 on the same side of the vessel. The at least one battery pack 19 is swappable, i.e. removable from the vessel 14 and exchangeable, such that when the at least one battery pack 19 is wholly or partly depleted, it can be swapped for a corresponding battery pack 19 that has been charged in the charging station 23.

The vessel's battery room 18 comprises at least one battery bay 22, but preferably two or more battery bays 22, where a battery pack 19 can be placed in each battery bay. The battery packs 19 can comprise a single battery, but normally a battery pack 19 is made up of a plurality of batteries that are coupled together into a battery pack in a known way. The battery room 18 is preferably equipped with a hatch that can be opened and closed.

The battery station's at least one battery bay 22 is preferably provided with the same type of electric coupling elements as the at least one charging bay 24 such that the at least one battery bay 22 and the battery packs 19 used are provided with cooperating electric coupling elements, which means that when a battery pack is placed in the at least one battery bay 22, the cooperating electric coupling elements automatically come into contact with each other, thereby enabling the at least one battery pack 19 to deliver power to the electric motors and other electric power consumers on the vessel 14. The cooperating electric coupling elements may, for example, comprise electric plugs or spring elements of metal arranged in the at least one battery bay 22 and corresponding metal faces on the battery packs 19 against which the spring elements are pressed when a battery pack 19 is placed in the at least one battery bay 22. As long as the charging station's at least one charging bay 24 and the battery room's at least one battery bay 22 are provided with the same type of electric coupling element, for example, plugs or metal spring elements, the battery packs 19 can be moved between the battery room's at least one battery bay in the vessel 14 and the charging station's at least one charging bay 24 and the battery room's at least one battery bay 22 without difficulty.

The transport system 10 also comprises a transfer device 31 that is used to transfer a battery pack from the battery room 18 in the vessel 14 into the charging station 23 for charging a discharged battery pack, or to transfer a charged battery pack 19 from the charging station 23 to the vessel's battery room 18 for providing electric power for operation of electric motors and other electric power consumers on the vessel 14. The transfer device 31 can have different configurations as shown in the figures and explained in more detail below. For example, the transfer device 31 and the charging station 23 can be separate devices, or the transfer device 31 can be mounted to the charging station 23 or optionally to the battery room 18.

A battery pack 19 that is located in a charging bay 24 in the charging station will normally be moved onto the transfer device 31. The transfer device 31 supports the battery pack 19 whilst it is moved towards the battery room 18 on the vessel 14, which has docked and is preferably securely moored to the quay facility 12. For support of a battery pack 19, the transfer device is preferably provided with a support plate 33, a battery transfer plate 26 or the like that provides good support for the battery pack 19. Once the battery pack 19 is in the right position relative to a battery bay 22 in the battery room 18, the battery pack 19 can be moved from the transfer device 31 into the battery bay 22 where the battery pack is automatically coupled to the vessel's electric system as explained above. In the opposite direction, when a depleted battery pack is to be charged, the battery pack 19 is moved from its battery bay 22 onto the transfer device 31, and the transfer device 31 is then moved towards the charging station 23 until the battery pack 19 is in the right position relative to a charging bay 24 in the charging station 23, after which the battery pack 19 is moved from the transfer device 31 into the charging bay 24 where the battery pack 19 is automatically coupled to the charging station and the power supply as explained above, such that the battery pack 19 can receive the necessary charging current for charging the battery pack.

To position the transfer device 31 in the correct position relative to a battery bay 22 in the battery room 18 before a battery pack 19 is moved from the transfer device 31 into the battery bay 22 or from the battery bay 22 onto the transfer device 31, or similarly to put the transfer device 31 in the correct position relative to a charging bay 24 in the charging station 23 before a battery pack 19 is moved from the transfer device 31 into the charging bay 24 or from the charging bay 24 onto the transfer device 31, the transport system 10 is preferably provided with a control system comprising sensors that are signal-connected to a control unit, and that register the position of the transfer device 31 in relation to a battery bay 22 in the battery room 18 or in relation to a charging bay 24 in the charging station 23, and controls and adjusts the movements of the transfer device 31 until it is in a position in which a battery pack can be moved between the transfer device 31 and a battery bay 22, or vice versa, or between the transfer device 31 and a charging bay 23, or vice versa.

The vessel 14 will move in the water to a greater or lesser degree and will therefore move relative to the quay 12 and thus also relative to the charging station 23 and the transfer device 31 located on the quay 12. These motions must be taken into account when a battery pack 19 is to be transferred between the transfer device 31 and a battery bay 22, or vice versa. The transfer device 31 is therefore equipped with one or more sensors, which also are signal-connected to the control unit, and which register the vessel's motions in relation to the transfer device 31. The transfer device, or optionally the charging station if the transfer device 31 is mounted to the charging station 23, is further provided with a compensating system that is regulated by the control unit based on input from the sensors that register the vessel's 14 motions in the water. Similar compensating devices which compensate for relative motion between devices that occurs because of motions in the water typically comprise one or more hydraulic cylinder/piston devices and are, inter alia, known from equipment used in connection with offshore oil and gas exploration and production and will not be described in more detail here.

In order to be sure that the battery packs 19 are held in place in their respective battery bays 22 when the vessel is out at sea, and also in high seas and difficult conditions, one or more fastening devices and/or holding devices are preferably provided in the battery room 18. The fastening devices can, for example, be bolts that are arranged in the battery room 18 and that are passed into corresponding holes in the battery packs 19, whilst the holding devices may be beam-shaped or plate-shaped elements or the like that are pressed against one or more surfaces, preferably against the top and/or opposing sides of the battery packs 19. Other fastening or holding devices capable of securing the battery packs in their respective battery bays 22 could also conceivably be used.

The battery packs 19 are transferred between the charging station 23 and the battery room 18 with the aid of wheels or roller conveyors. The battery packs 19 can be provided with wheels either in or on the underside of the battery packs 19 so as to enable a battery pack 19 to be wheeled from a charging bay 24 onto the transfer device 31, and from the transfer device 31 into a battery bay 22 in the battery room and back in the opposite direction. To have a more controlled movement of a battery pack 19 from a charging bay 24 onto the transfer device 31 and then into a battery bay 22, and vice versa, the charging bay 24, the transfer device 31 and the battery bay 22 or roller conveyor can be provided with rails on which the battery packs can roll. Optionally, the charging station 23 and/or the transfer device 31 can be provided with a device capable of pushing and pulling a battery pack 19 such that it slides on the rails in the case where neither the battery packs 19 nor the at least one charging bay 24 nor the at least one battery bay 22 is provided with wheels.

Alternatively, wheels may be arranged in the at least one charging bay 24, the transfer device 31 and the at least one battery bay 22 on which a battery pack 19 can roll when it is moved from a charging bay 24 onto the transfer device 31 and into a battery bay 22 and back in the opposite direction. To have a controlled movement of a battery pack 19 from a charging bay 24 onto the transfer device 31 and then into a battery bay 22, and vice versa, the charging bay 24, the transfer device 31 and the battery bay 22 can be provided with guiding elements or leading elements that force a battery pack 19 to move in the right direction.

A first embodiment of the transport system 10 is shown in FIGS. 1-5. FIG. 1 shows a vessel 14 that has docked at a quay facility or quay 12 supported on piles 13. The vessel can be moored to the quay 12 in the usual way or anchored to the quay 12 using one or more mooring devices equipped with suction cups. On the quay 12, the charging station 23 and the transfer device 31 are arranged in such a way as to enable the vessel 14 to swap one or more battery packs 19, which are more or less depleted, for freshly charged battery packs 19. As mentioned above, the transfer device 31 and the charging station 23 do not necessarily need to be arranged on a quay, but can also be arranged on a mole, a pier, some form or other of floating facility such as, for example, a platform or ship for hydrocarbon exploration or production, or on other types of installations on which a charging station 23 and a transfer device can be arranged, and which a vessel 14 can dock at and be moored to so as to allow battery packs 19 to be transferred back and forth between the charging station 23 and the vessel's battery room 18 with the aid of the transfer device 31.

FIG. 1 further shows the charging station 23 that is provided with wheels (not shown on the figures), and is movably supported on rails 50 such that the charging station can be moved back and forth on the quay 12 in a direction that is essentially parallel to the hull side 16 of the vessel, in order to be able to adjust the position of the charging station 23 relative to the position of the transfer device and/or the position of the vessel's battery room 18 when the vessel 14 is moored to the quay.

Between the charging station 23 and the vessel 14, there is shown a curtain device 29 that is preferably mounted on the charging station 23 and can be pulled out towards the hull side 16 of the vessel in the same way as the end of the passenger boarding bridge between an airport terminal and the doorway of an aircraft. The curtain device 29 is, as indicated in the figures, preferably made of a flexible material that is waterproof and windproof, for example, a material used for tarpaulins, and accordion-folded such that the curtain device 29 can be extended out towards the hull side 16 of the vessel and compressed against the charging station 29 after use.

When the curtain device 29 has been pulled out towards and rests against the hull side 16 of the vessel, it will protect the transfer device 31 and the battery packs 19 being transferred between the charging station 23 and the battery room 18, or vice versa, from precipitation and wind.

The transfer device 31 is underneath the curtain device 29 in FIG. 1 and is therefore not visible, but is movably supported on rails 51 such that the transfer device 31 can be moved back and forth on the quay 12 in a direction that is essentially parallel to the vessel's hull side 16, in order to be able to adjust the position of the transfer device in relation to the position of the charging station and/or the position of the vessel's battery room 18 when the vessel 14 is moored to the quay.

Figure 2:
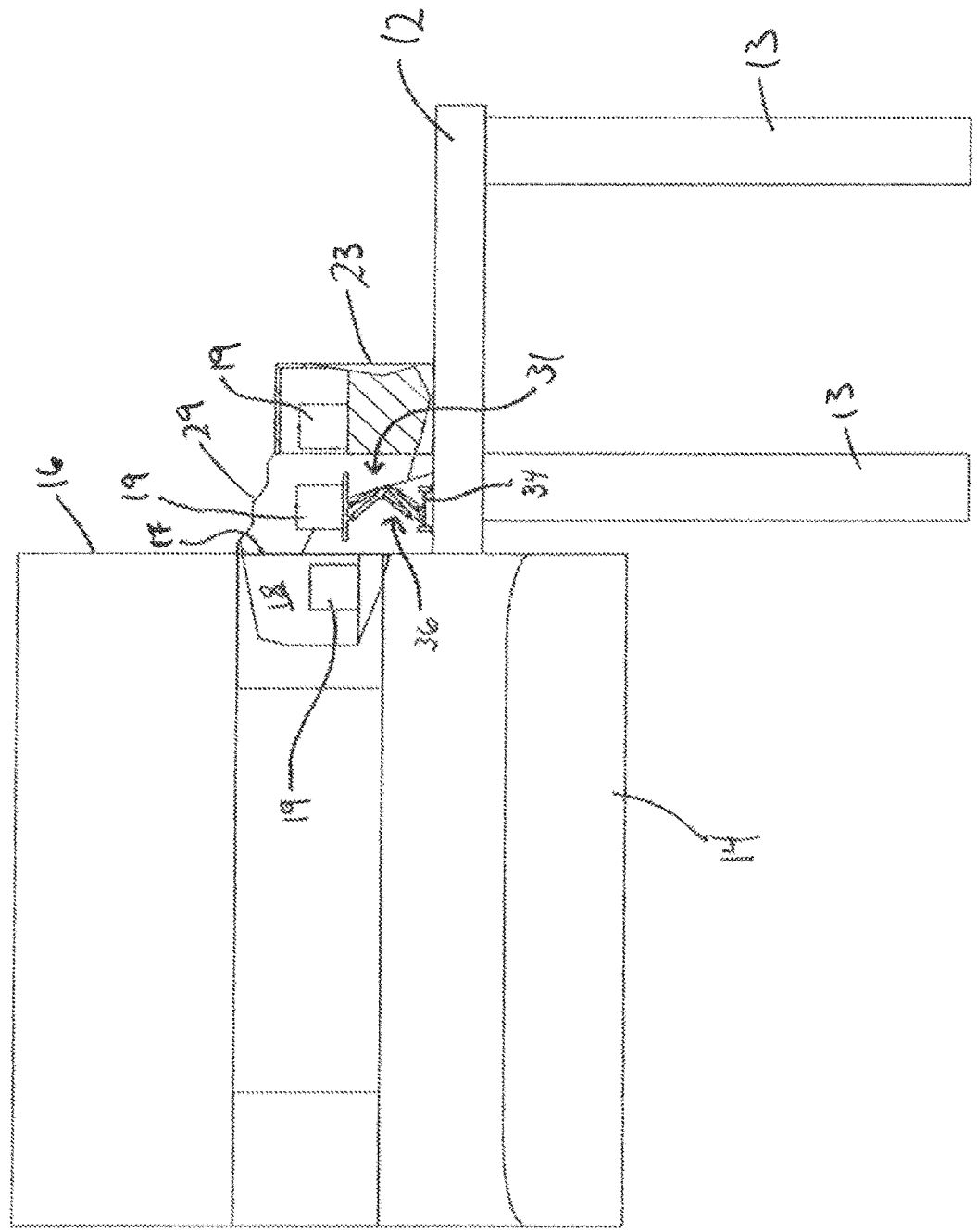
FIG. 2 is a rear view of the embodiment of the transport system shown in FIG. 1.
Figure 3:
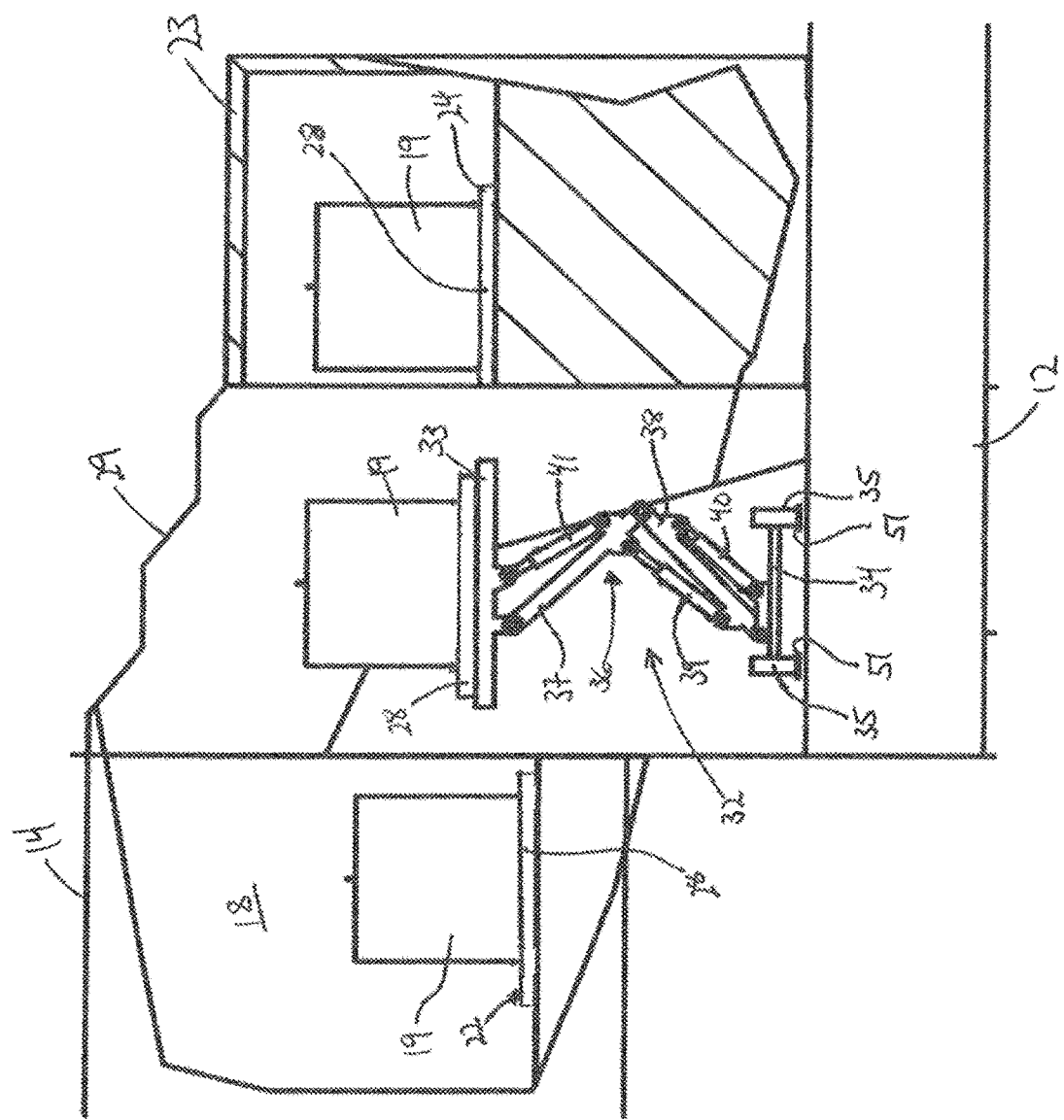
FIG. 3 is an enlarged sectional view of the transport system shown in FIG. 2, which includes the charging station, battery room and transfer device.

FIG. 2 is a rear view of the transport system 10 shown in FIG. 1, and FIG. 3 is an enlarged view of the section of the charging station 23, transfer device 31 and battery room 18 in the vessel 14 indicated in FIG. 2.

The battery room 18 is provided with an opening 17 in the vessel's essentially vertical hull side 16, which gives direct access to the battery room 18 from the outside of the vessel 14 such that a freshly charged battery pack 19 can easily be installed in the battery room and a more or less depleted battery pack 19 can easily be removed from the battery room 18. The opening 17 is preferably provided with a hatch (not shown in the figures) that can be closed when the vessel 14 is in use and opened when one or more depleted battery packs 19 are to be swapped for freshly charged battery packs 19.

The transfer device 31 comprises a frame 32 and a support plate 33 mounted on the frame 32. The frame 32 comprises a movement mechanism 36 mounted on a support part 34. The support part 34 is provided with wheels that preferably run on rails 51 as indicated in the figures, but the transfer device 31 can also be arranged freely moving, i.e., that it is not restricted to moving along the rails 51.

The movement mechanism 36 is adapted to move the support plate 33 back and forth between a position immediately opposite a charging bay 24 in the charging station 23 so that a battery pack 19 can be moved from the support plate 33 into the charging bay 24 or from the charging bay 24 onto the support plate 33, and a position immediately opposite a battery bay 22 in the battery room 18 so that a battery pack 19 can be moved from the support plate 33 into the battery bay 22 or from the battery bay 22 onto the support plate 33. The movement mechanism 36 must therefore normally be configured such that it at least can move the support plate 33 in a vertical direction and in a first direction in the horizontal plane that extends perpendicularly from the battery room 18. To adjust the position of the transfer device 31 in another direction in the horizontal plane that is essentially at right angles to said first direction in the horizontal plane, the transfer device 31 can be moved along the rails 51 until a desired position immediately opposite a charging bay 24 in the charging station 23 or a battery bay 22 in the battery room 18 has been found.

To be able to move the support plate 33 in both a vertical direction and a direction perpendicular to the battery room 18, the movement mechanism can be configured with a plurality of rotatable rods, which in a known way are moved, with the aid of hydraulic cylinder/piston devices. For example, the movement mechanism 36 can comprise, as shown clearly in FIG. 3, a first rod 37 which at one end is rotatably fastened to the support plate 33 and at the other end is rotatably fastened to a second rod 38. At the opposite end, the second rod 38 is rotatably fastened to the support part 34. A first cylinder/piston device 39 is at one end rotatably fastened to the second rod 38 close to the lower end of the second rod, and at the other end is rotatably fastened to the first rod 37 close to the point of connection between the first rod 37 and the second rod 38. A second cylinder/piston device 40 is at one end rotatably fastened to the support part 34 and at the other end is fastened to the second rod 38 close to the point of connection between the first rod 37 and the second rod 38. Lastly, the movement mechanism 36 comprises a third cylinder/piston device 41 which at one end is rotatably fastened to the support plate 33 and at the other end is fastened to the first rod 37 close to the point of connection between the first rod 37 and the second rod 38. To increase stability, the transfer device can optionally be provided with two or more such movement mechanisms 36.

Figure 4:
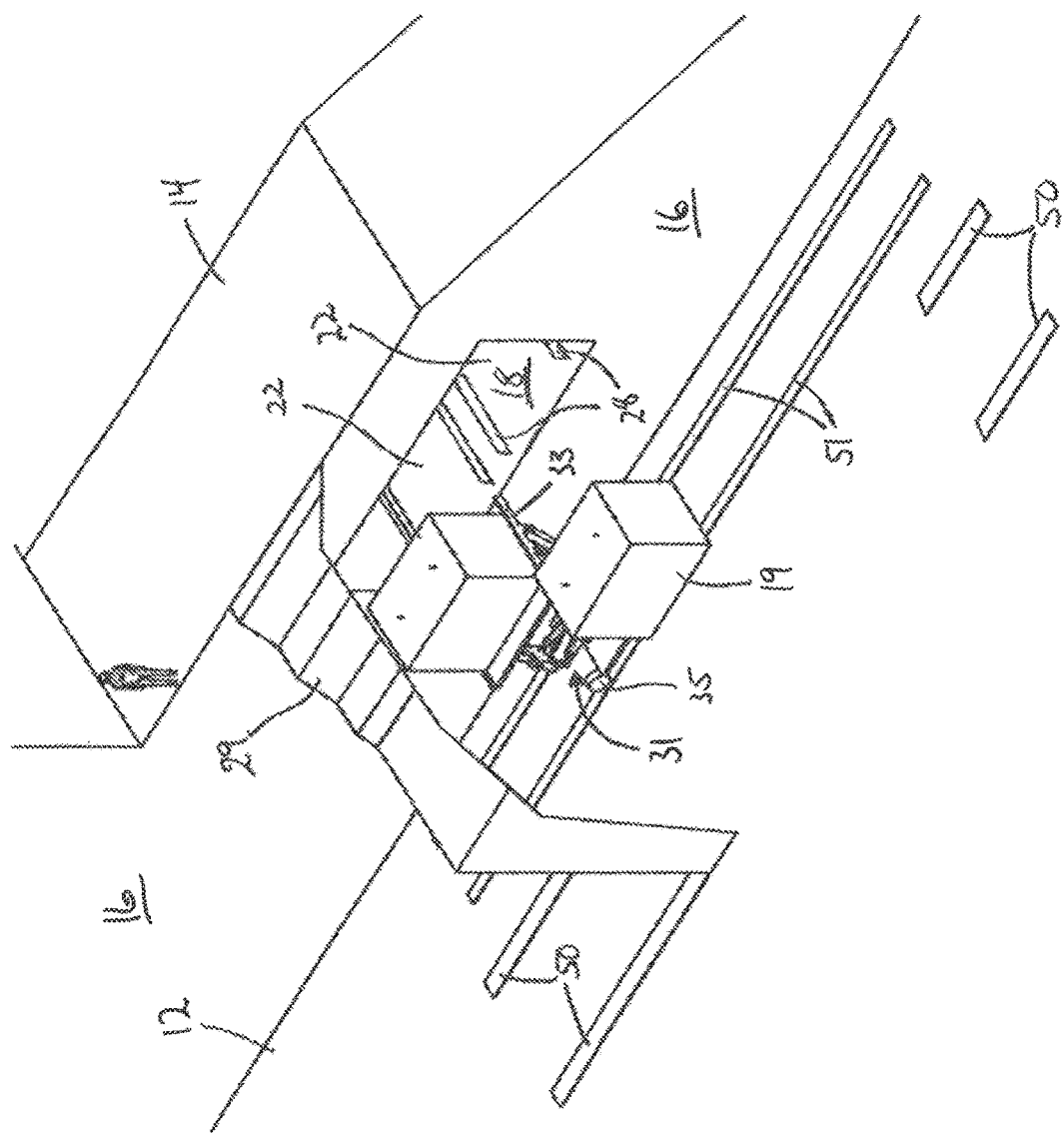
FIG. 4 is an enlarged sectional view of the transport system in FIG. 1, where the weather-protecting curtain has been partly removed.
Figure 5:
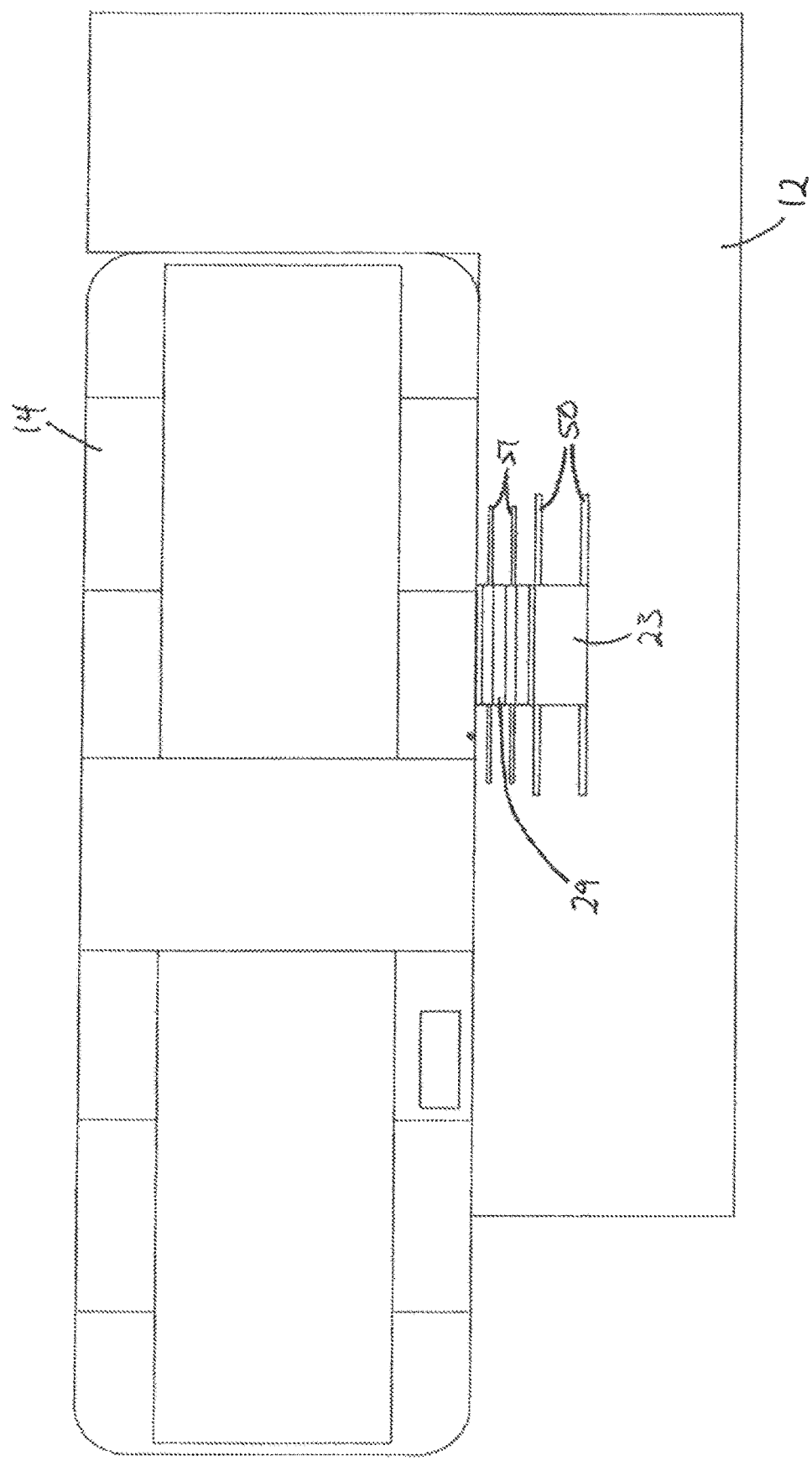
FIG. 5 is a top view of the embodiment of the transport system shown in FIG. 1.

In FIG. 4 it is indicated that the battery room 18 can be configured with two battery bays 22 and that the charging station 23 can be configured with two charging bays 24. This means that one battery pack 19 can be placed in the vessel 14 and one battery pack can be arranged in the charging station for recharge. When changing battery packs, it will then be easy to transfer the charged battery pack 19 from its place in the charging bay in the charging station 23 into a vacant battery bay in the battery room 18 in the vessel 14, and equally simple to transfer the more or less depleted battery pack 19 in the battery room 18 from its battery bay in the battery room 18 to a vacant charging bay in the charging station 23.

In FIGS. 3 and 4 it is also indicated that the transfer device support plate 33, the charging bays 24 and the battery bays 22 are provided with guiding devices or guiding elements 28 that lead or guide the movement of the battery packs into and out of the charging bay and the battery bay and onto the support plate 33. The guiding elements 28 may be rails on which the battery packs 19 roll or slide when they are transferred between a battery bay 22 and a charging bay 24, via the transfer device 31, and vice versa. The guiding elements can also be guiding or leading elements that guide the battery packs 19, for example, if they are provided with wheels such that they roll from a charging bay 24 onto the support plate 33 and then into a battery bay 24, or vice versa, in order to guide or lead a battery pack 19 into the right position in the at least one battery bay 22 and the at least one charging bay 24.

Figure 6:
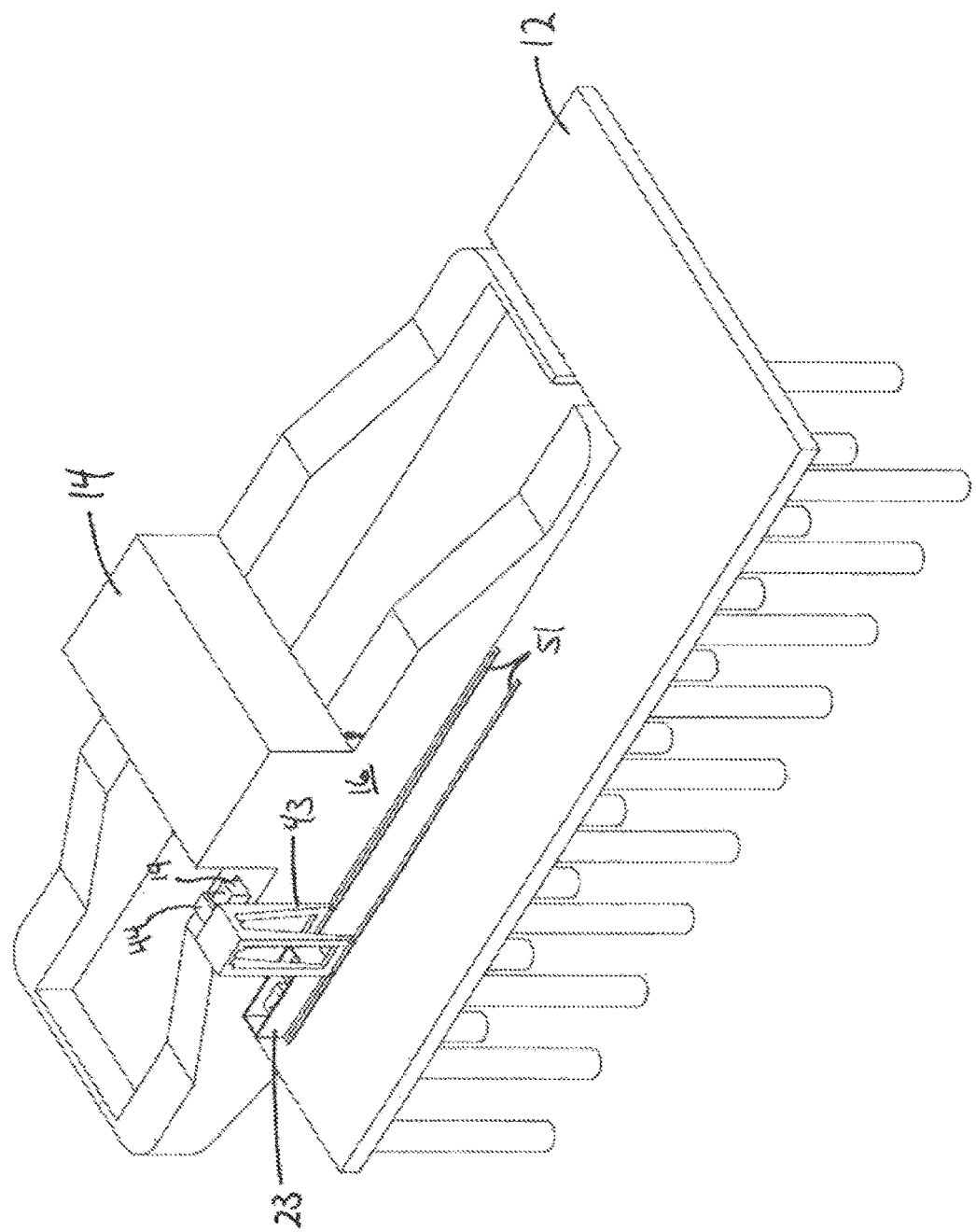
FIG. 6 shows a second embodiment of a transport system, where the transfer device comprises a lifting means that lifts and lowers the battery packs out of and into the battery room.
Figure 7:
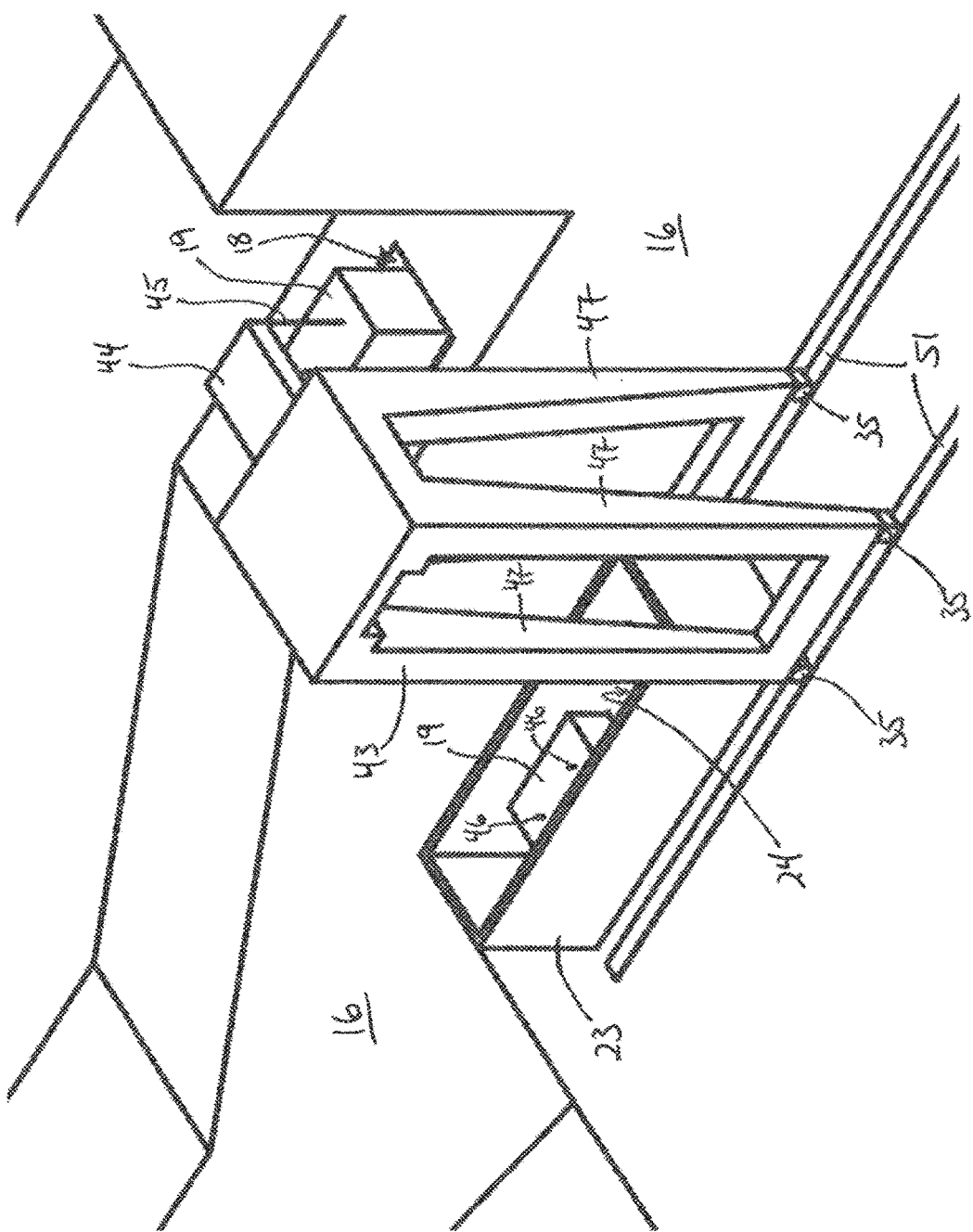
FIG. 7 is an enlarged sectional view of the transport system shown in FIG. 6.
Figure 8:
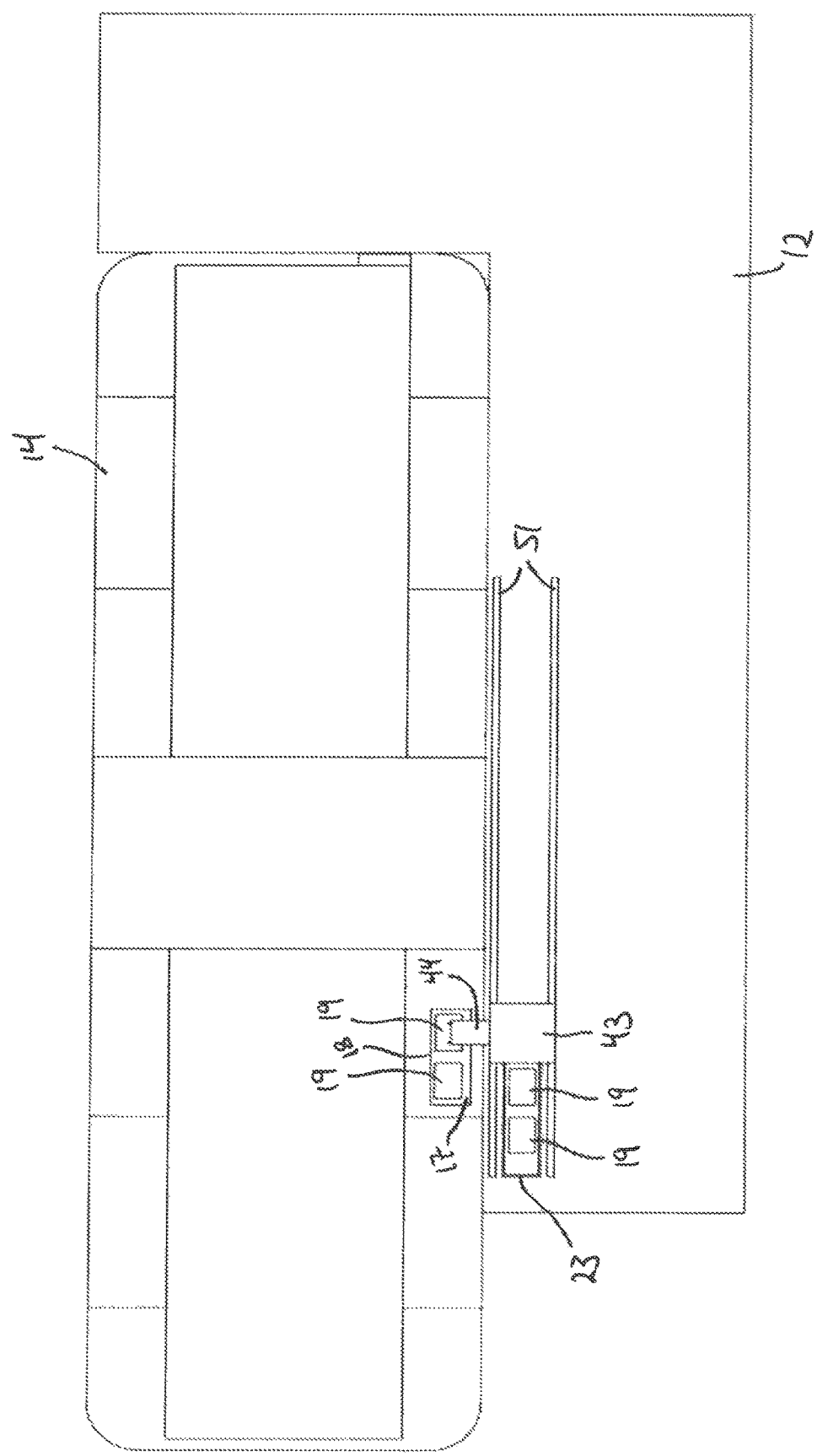
FIG. 8 is a top view of an embodiment of the transport system shown in FIG. 6.
Figure 9:
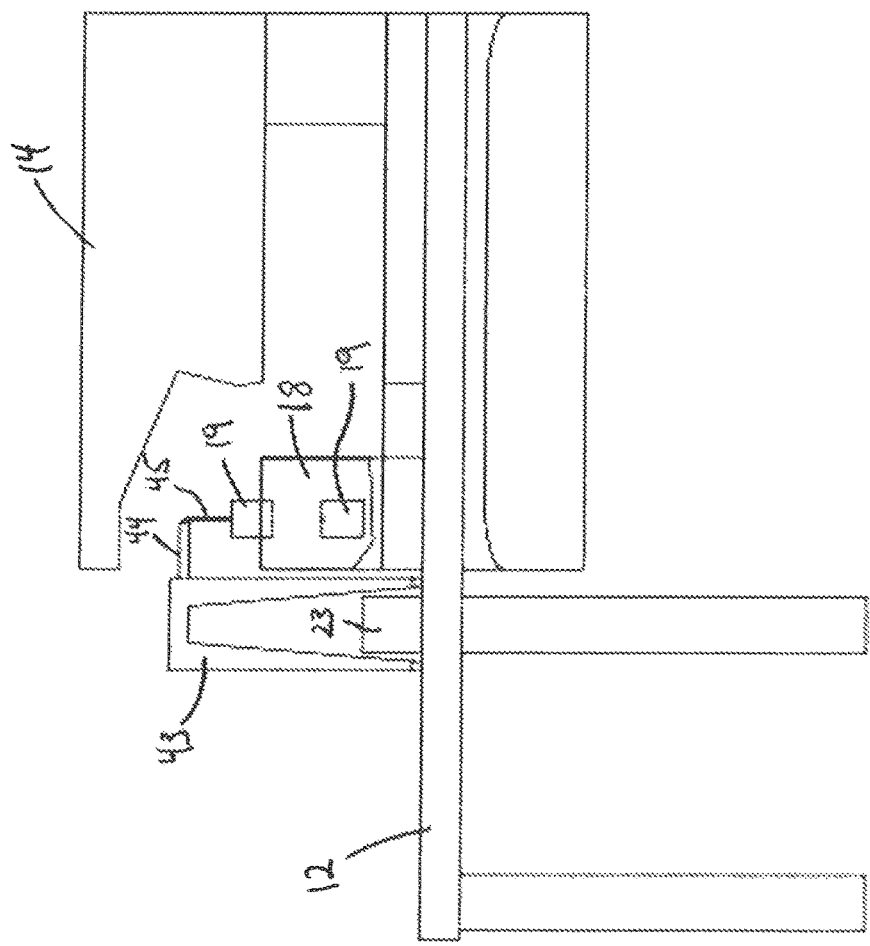
FIG. 9 is a front view of the second embodiment of the transport system shown in FIG. 6.

FIGS. 6-8 show an embodiment of the transport system 10 where the battery packs 19 are transferred in an alternative way compared to the embodiment shown in FIGS. 1-5.

In this embodiment, the opening 17 to the battery room 18 is arranged such that the battery packs 19 must be vertically lowered into and lifted out of a battery bay 22 in the battery room, and also the charging station is configured such that the battery packs 19 are vertically lowered into and lifted out of the battery bays 24 in the charging station.

To facilitate this, the transfer device 31 comprises a tower support part 43 with a plurality of legs 47, for example, four legs as shown in the figures. The legs 47 of the tower support part 43 are provided with wheels 35 in their underside, and are preferably, but not necessarily, arranged on rails 51 such that the tower support part 43 can be moved back and forth in a direction essentially parallel to the quay edge and thus the hull side 16 of the vessel 14 when the vessel is moored to the quay 12.

The charging station 23 is disposed between the rails 51 and the legs 47 are sufficiently high as to allow that the tower support part 43 to be moved over the charging station 23.

The tower support part further comprises a lifting arm 44 that is movably supported in the tower support part such that it can be moved back and forth in a direction that is essentially perpendicular to the longitudinal direction of the quay edge and the rails 51.

The tower support part 43 also comprises at least one, but preferably two or more winch devices (not visible on the figures) with associated wires 45 that can be connected to fastening eyes 46 on the upper side of the battery packs 19. The lifting arm 44 can be moved back and forth between an outer position in which it extends over the battery room 18 and the wires 45 extend essentially vertically down to the fastening eyes 46 on a battery pack 19 placed in a battery bay 22 in the battery room 18 such that the wires can easily be fastened to the fastening eyes, for example, with hook devices secured to the end of the wires 45, and an inner position in which a battery pack 19, which has been hoisted up by the winch devices, will hang in the air from the wires 45 between the rails 51 and above the charging station 23. With the aid of the winch devices, a battery pack can thus be lifted up from and lowered into a battery bay 22 in the battery room 18 and a charging bay 24 in the charging station 23. The distance between the legs 47 must therefore be sufficiently great to allow a battery pack 19 to be passed between the legs as the lifting arm 44 is moved from its outer position to its inner position, or vice versa.

Figure 10:
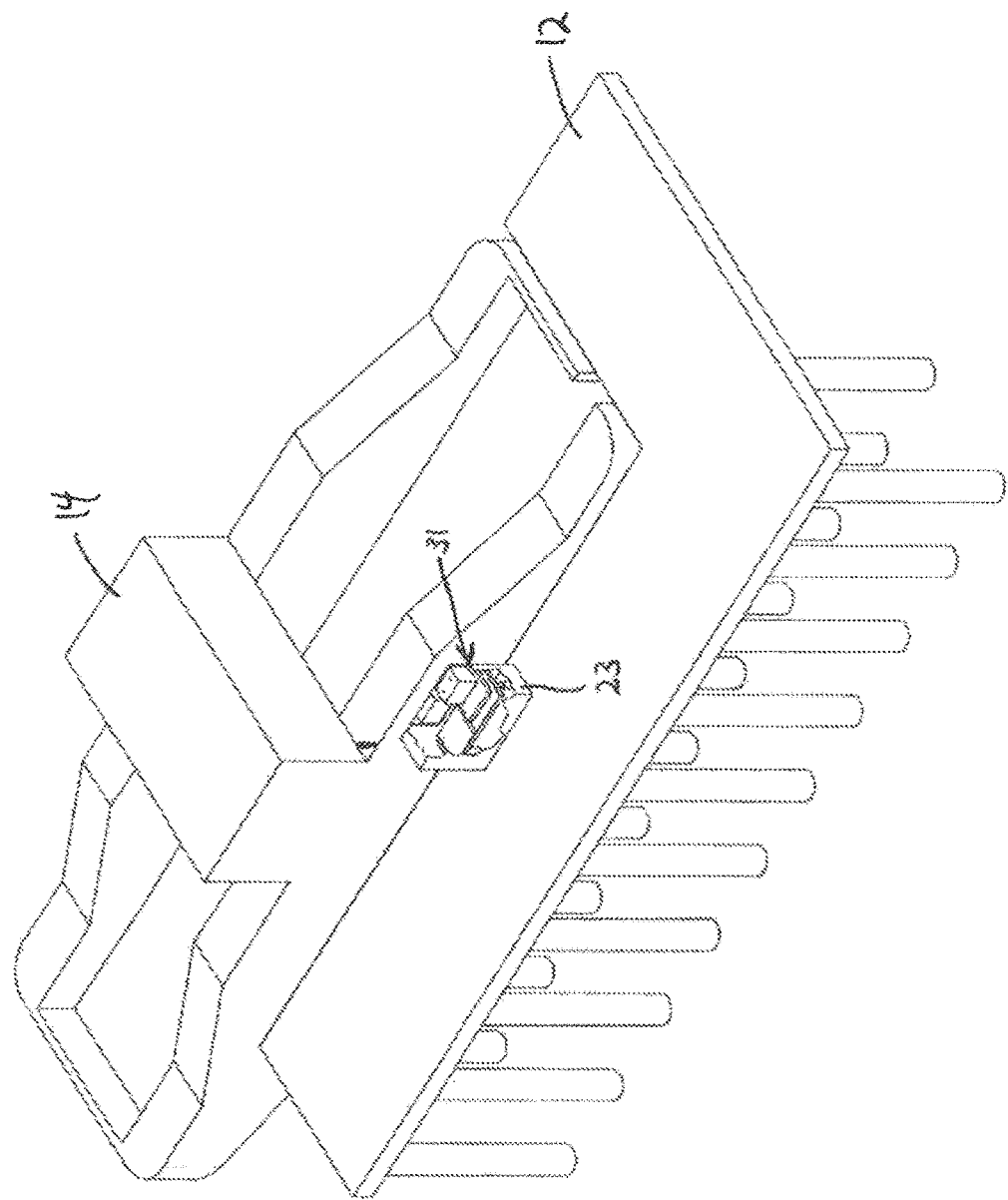
FIG. 10 shows a third embodiment of a transport system, where the charging station is very close and the transfer device is tightly integrated in the charging station.
Figure 11:
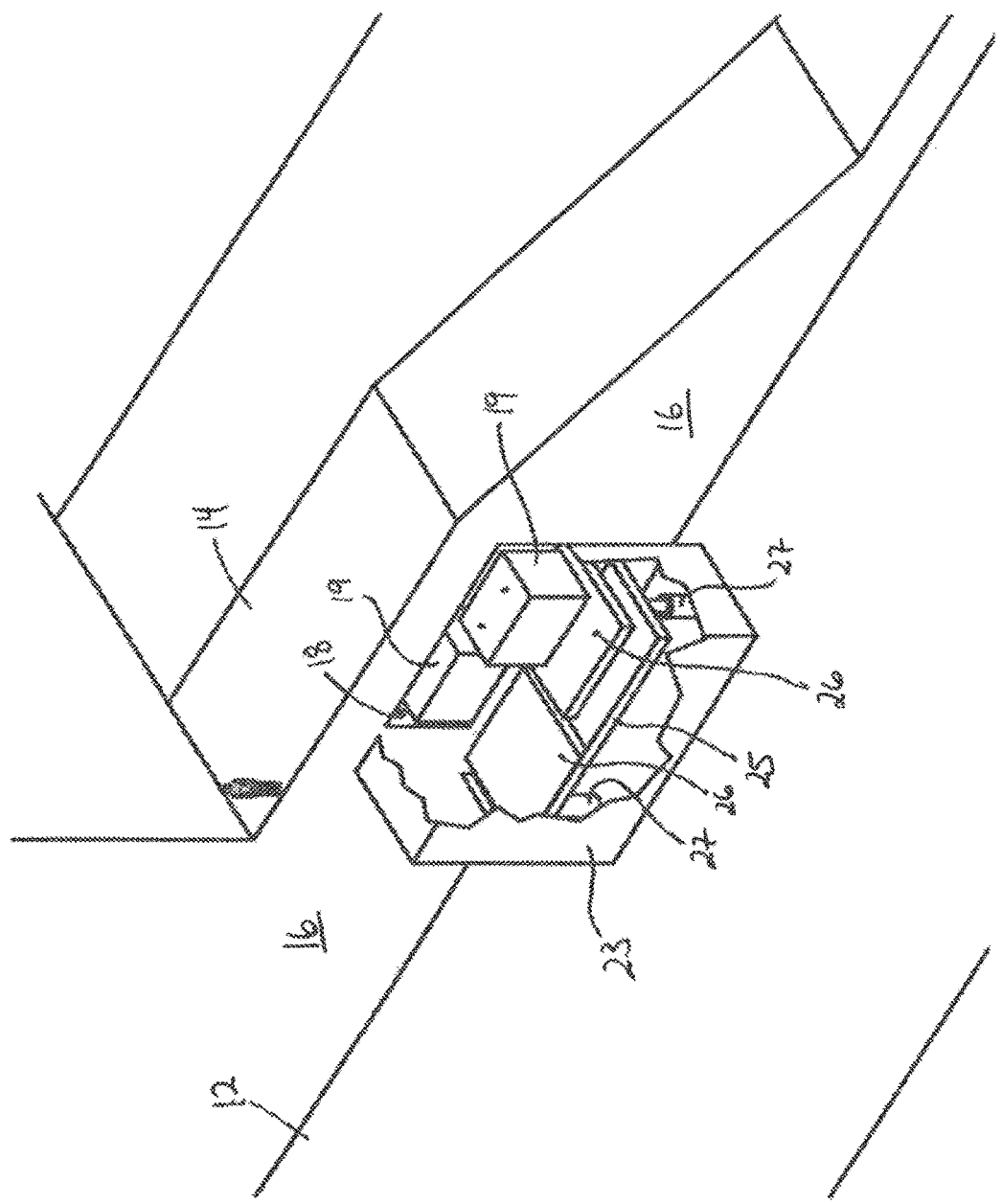
FIG. 11 is an enlarged sectional view of the transport system shown in FIG. 10.

FIGS. 10-11 show an embodiment of the transport system 10 where the transfer device 31 is installed in the charging station 23, and in many ways constitutes an integral part of the charging station. As this embodiment does not comprise a separate transfer device 31, the charging station 23 is arranged at a relatively short distance from the end of the quay 12 and thus also the hull side 16 of the vessel 14 when it is moored to the quay.

The charging station 23 comprises a charging station support plate 25 that is mounted on at least one, but preferably two or more cylinder/piston devices 27 such that the charging station support plate 25 can be moved up and down in an essentially vertical direction.

The transfer device 31 comprises a battery transfer plate 26 which on its bottom edge is fastened to the charging station support plate 25 by telescopic fasteners (not visible in the figures), such that the battery transfer plate 26 can be moved forward towards a battery bay 22 in the battery room 18 and back into the charging station 23. The battery transfer plate 26 and the at least one battery bay 22 in the battery room 18 can be provided with guiding elements 28 as described in connection with the first embodiment above, where the guiding elements 28 can be rails on which a battery pack 19 can roll or slide when it is moved from the battery transfer plate 26 into a battery bay 22 in the battery room 18, or in the opposite direction. Alternatively, the battery packs 19 can be provided with wheels and the guiding devices 28 can be leading or guiding elements that ensure that a battery pack 19 moves in a desired direction onto the battery transfer plate 26 and into the at least one battery bay 22.

Figure 12:
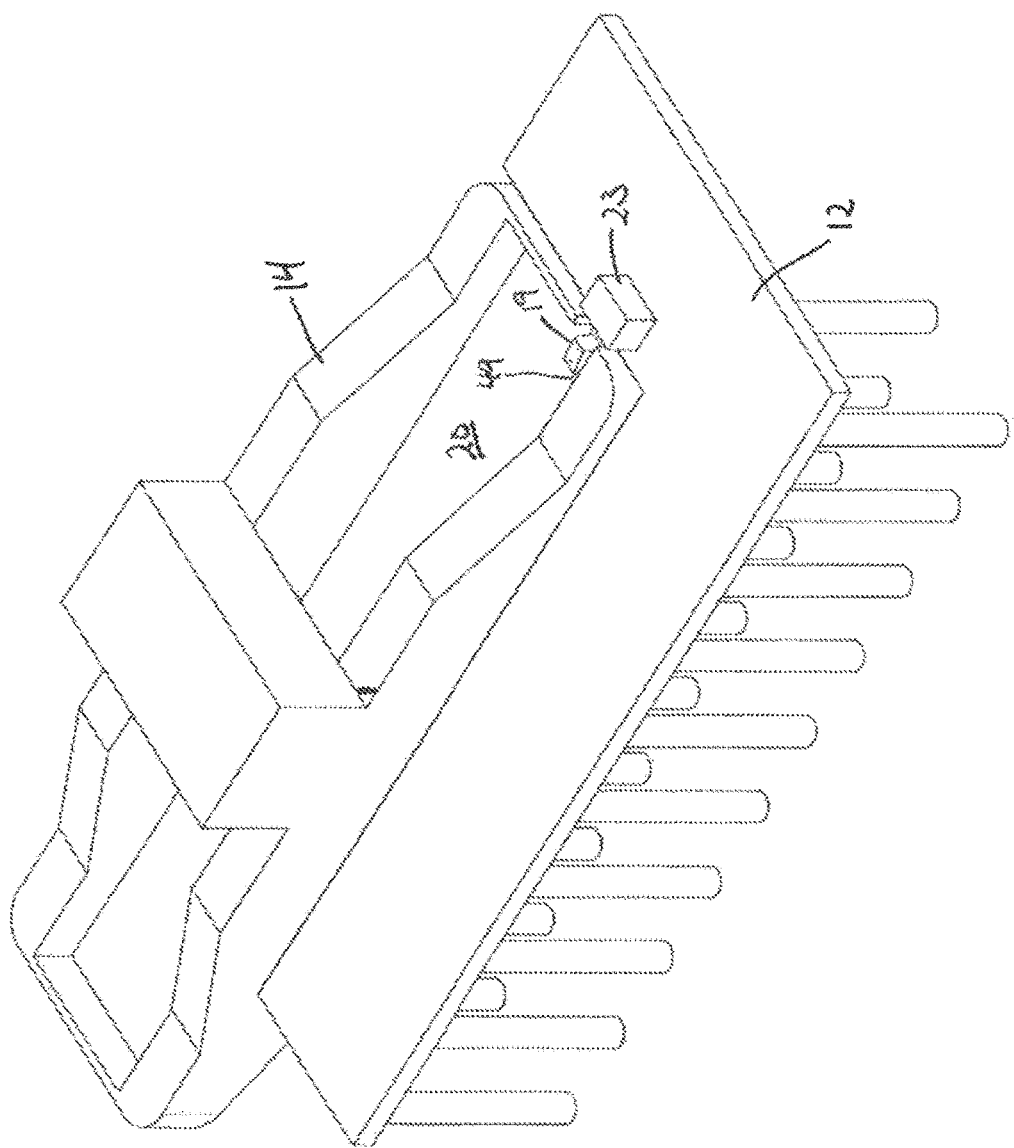
FIG. 12 shows a fourth embodiment of a transport system, where the battery pack is wheeled/rolled on a transfer device onto a deck on the vessel before the battery pack is moved into the battery room.
Figure 13:
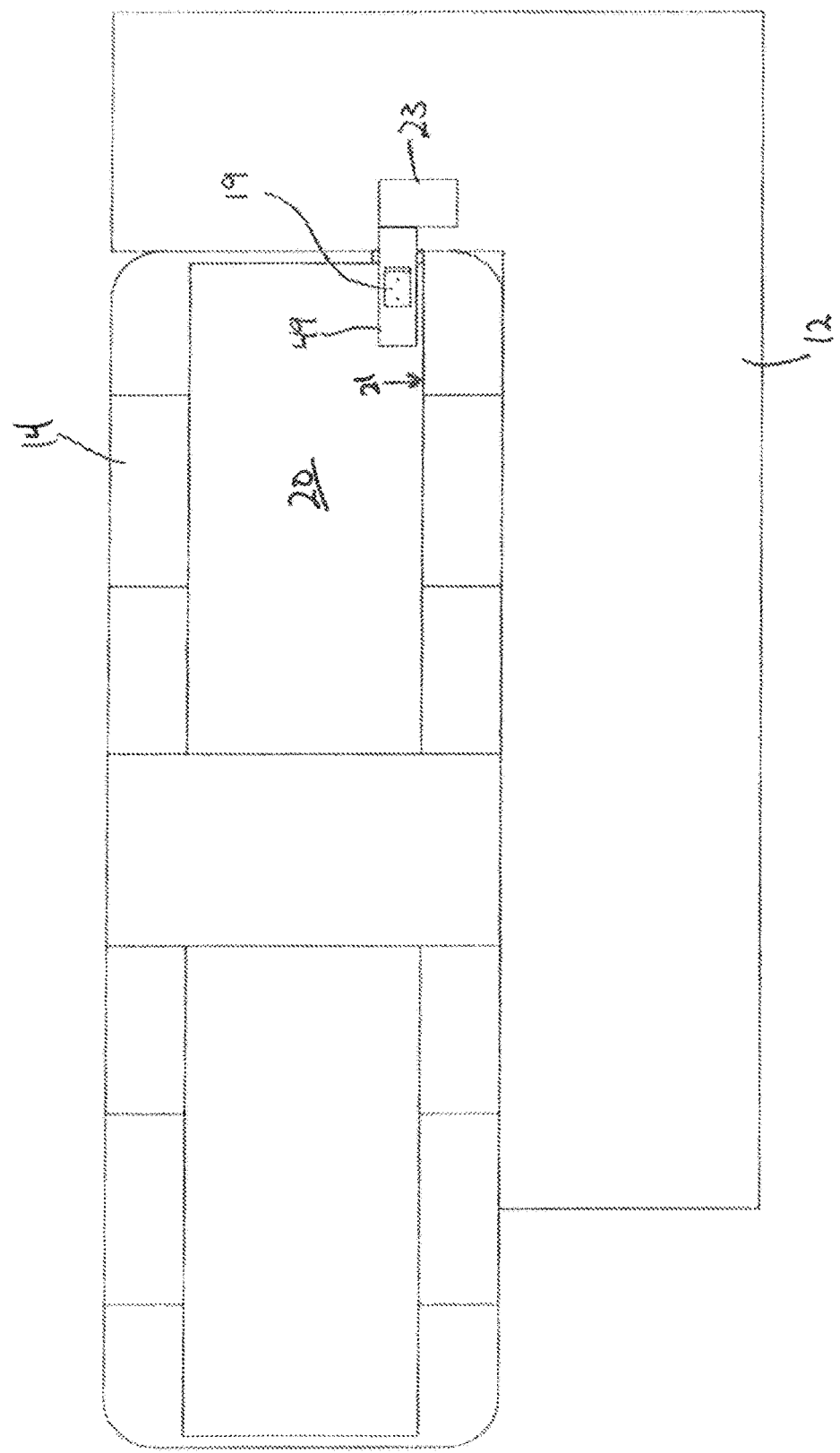
FIG. 13 is a front view of the embodiment shown in FIG. 12.
Figure 14:
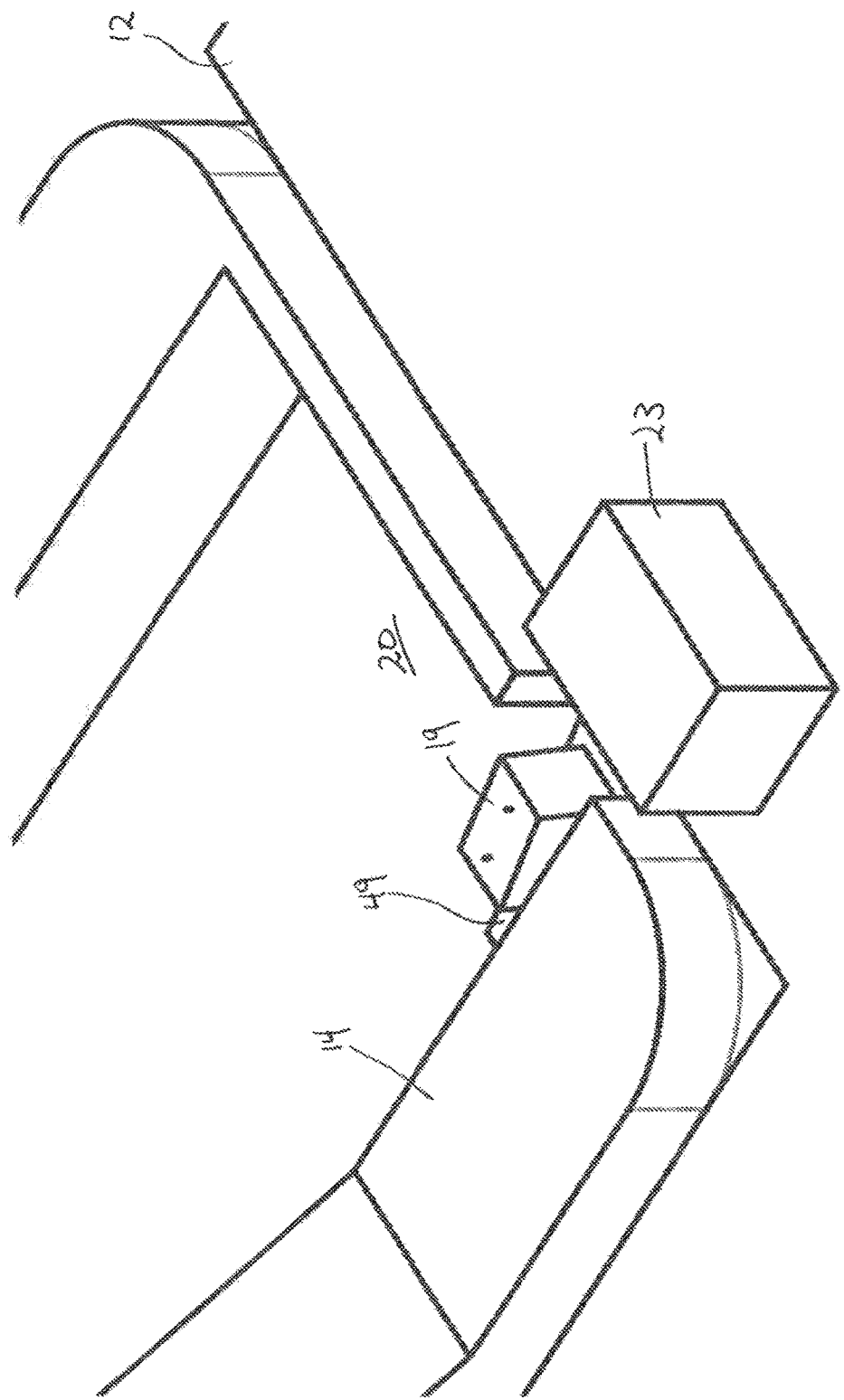
FIG. 14 is an enlarged sectional view of the embodiment shown in FIG. 12.

Finally, a fourth embodiment of the transport system 10 is indicated in FIGS. 12-14 where the charging station 23 is positioned such that the battery packs 19 can be moved onto a deck 20 on the vessel 14. Furthermore, the transfer device 31 comprises a battery pack gangboard 49 that extends from the at least one charging bay in the charging station towards the battery room 18.

The battery room 18 can in this case be placed in a shaft (not shown in the figures) that extends down into the vessel 14 from the deck 20. A battery bay 22 may then comprise a battery pack support plate that is arranged in the battery room to be movable in an essentially vertical direction, for example, by one or more cylinder/piston devices in a similar way as the charging station explained in connection with the embodiment shown in FIGS. 10-11. A battery pack 19 can thus be moved straight from the battery pack gangboard 49 onto the battery pack support plate and lowered into the battery bay in the battery room, and vice versa.

Alternatively, the battery room 18 can be arranged in a sidewall of the hull facing inwards towards the deck 20. In this case, the at least one battery bay 22 in the battery room can be provided with a battery pack support plate that is telescopically fastened to the battery bay 22 in the same way as the battery transfer plate 26 is fastened to the charging station in the embodiment shown in FIGS. 10-11, such that the battery pack support plate can be moved out of a battery bay and preferably remain lying as an extension of the battery pack gangboard 49. A battery pack 19 can thus be moved directly from the battery pack gangboard 49 onto the battery pack support plate, or vice versa.

The at least one charging bay 24 in the charging station 23, the battery pack gangboard 49 and the battery support plate are preferably provided with guiding elements 28 as described in connection with several embodiments above, which guiding elements 28 can be rails on which a battery pack 19 can roll or slide when it is moved from the at least one charging bay 24 in the charging station 23, across the battery pack gangboard 49 and onto the battery pack support plate, or in the opposite direction. Alternatively, the battery packs 19 can be provided with wheels and the guiding devices 28 can be leading or guiding elements that ensure that a battery pack 19 moves along a desired direction and path into the at least one charging bay 24, onto the battery pack gangboard 49 and onto the battery pack support plate.

The battery pack gangboard 49 may be a separate device that can be telescopically configured and fastened to the charging station 23 such that it can be telescoped out and onto the deck 20 of the vessel 14 when one or more, more or less depleted battery packs 19 are to be swapped with a corresponding number of charged battery packs. Alternatively, it may in some cases be relevant to use an existing ramp on the vessel 14 also as a battery pack gangboard 49 for the battery packs 19. For example, many ferries have a ramp that is laid down and remains lying on the quay 12 such that persons and/or vehicles can walk/drive ashore or onto the vessel 14 from the shore, which also could be used as a battery pack gangboard 49.

In the different embodiments of the transport system 10 illustrated in the figures, the vessel is a ferry. However, it should be understood that the transport system 10 can of course also be used on any other type of vessel, such as cruise ships, cargo vessels operating on permanent routes, supply ships for offshore installations etc. As battery development continues to evolve, it is anticipated that battery capacity will increase significantly in the future and thus the present transport system will also be of interest for vessels that sail over longer distances without the opportunity to change batteries en route.

It should also be mentioned that the quay facility 12 shown in the figures is a fixed quay, but the present transport system 10 could also conceivably be arranged on a floating or fixed installation incorporating a wind power plant or the like. The most obvious examples would be an oil/gas platform or an oil/gas production ship or a floating or fixed installation incorporating a wind power plant, a wave power plant or a tidal power plant, or an installation incorporating a solar panel plant. Other offshore installations with means for producing energy for charging one or more battery packs are also conceivable.

According to a transport system 10 as described above and shown in the figures, a number of advantages can be obtained. As the battery packs 19 are swappable, they can be upgraded or changed as the development of new and better batteries progresses. Since the battery packs 19 are swappable and can be charged in a charging station 23, the battery packs can be made smaller, which results in lower investment costs and savings of space and weight on the vessel 14. It also means that the battery packs 19 can be charged over a longer period, which will allow the charging current to be significantly lower. This means less load on the local power grid, whilst in smaller places, which may have a power grid of poor capacity, and which perhaps also lie some distance from a high-capacity grid, it may mean that that major costs are saved as the local grid does not need to be upgraded to be capable of delivering the necessary charging current. Lower charging current also results in a longer service life for the battery packs 19. Embodiments described herein further provide a solution allowing an electrically powered vessel to operate continuously over a long, in principle infinitely long, period of time without prolonged stops to charge batteries. A transport system or method according to embodiments described herein may further reduce the investment costs involved in getting an electrically powered vessel to function.

The embodiments of the present invention have been described with reference to some non-limiting examples. The invention is not limited to the embodiments described herein; reference should be had to the appended claims. A person of skill in the art will understand that various features of the embodiments, as explained above and shown in the figures, can be modified and that changes can be made within the scope of the invention as defined in the appended claims.

What is claimed is:

1. A transport system comprising:
a seagoing vessel comprising a battery room for at least one swappable battery pack for providing power to at least one electric motor for propulsion of the vessel;
at least two battery packs, of which at least one battery pack is arranged on the vessel when the vessel is in operation;
a charging station for charging the battery packs, which charging station is located outside the vessel, but such that the vessel can be positioned relative to the charging station for transfer of one or more of the battery packs between the vessel and the charging station; and
a transfer device for transfer of the battery packs back and forth between the vessel and the charging station when the vessel is positioned by the charging station,
wherein the charging station comprises at least one charging bay for securely holding at least one of the battery packs in the charging bay, wherein the at least one charging bay is provided with an electric contact element that is electrically connected to a power supply for charging the battery pack that is placed in the charging bay,
wherein the battery room comprises at least one battery bay for securely holding at least one of the battery packs in the battery room, wherein the at least one battery bay is provided with an electric contact element that is electrically connected to the at least one electric motor,
wherein the transfer device comprises a movable lifting arm movably mounted to the transfer device configured to move the at least one battery pack from a position over the at least one charging bay to a position over the at least one battery bay, and from the position over the at least one battery bay to the position over the at least one charging bay.

2. The transport system according to claim 1, wherein the at least one charging bay and the battery packs are configured with cooperating electric contact elements such that a battery pack is connected electrically to the power supply when the battery pack is placed in the at least one charging bay.

3. The transport system according to claim 1, wherein the transport system comprises a plurality of charging stations that are located at a corresponding number of ports of call for the vessel, and that the transport system further comprises at least a plurality of battery packs such that there is at least one battery pack in each charging station and at least one battery pack on the vessel.

4. The transport system according to claim 1, wherein the at least one battery bay in the battery room and the battery packs are provided with cooperating electric contact elements such that a battery pack is connected electrically to at least the vessel's electric motor or motors when the battery pack is placed in the at least one battery bay.

5. The transport system according to claim 1, wherein the vessel comprises a battery room hatch for opening and closing the battery room, the battery room hatch, when open, providing access to the battery room for changing a battery pack.

6. The transport system according to claim 1, wherein the charging station and/or the transfer unit is movably supported in at least one direction in a horizontal plane.

7. The transport system according to claim 1, wherein the transfer device comprises a frame and a support plate mounted on the frame, which frame comprises a movement mechanism adapted to move the support plate at least up and down and sideways in both directions between the charging station and the vessel's battery room.

8. The transport system according to claim 7, wherein the transfer device support plate is motion compensated with the aid of the movement mechanism to compensate for the vessel's motions in the water and for varying water levels.

9. The transport system according to claim 7, wherein the transfer device frame is provided with wheels such that the transfer device can be moved relative to the charging station and the vessel.

10. The transport system according to claim 1, wherein the transfer device comprises a battery transfer plate for support of the at least one battery pack, which battery transfer plate is mounted to the charging station and is movable in and out of the charging station in the direction of the vessel's battery room when the vessel lies at the charging station, such that the at least one battery pack can be transferred back and forth between the charging station and the vessel's battery room.

11. The transport system according to claim 10, wherein the transfer device battery transfer plate and the vessel's battery room comprise wheels on which the at least one battery pack can roll.

12. The transport system according to claim 10, wherein the transfer device battery transfer plate is motion compensated to compensate for the vessel's motions in the water and for varying water levels.

13. The transport system according to claim 1, wherein the transfer device comprises a battery gangboard that extends from the charging station onto a deck on the vessel.

14. The transport system according to claim 13, wherein the battery gangboard extends up to the vessel's battery room or to a battery room support plate that is moved out of the battery room such that a battery pack can be wheeled straight onto the battery room support plate.

15. The transport system according to claim 1, wherein the charging station and the battery room are designed such that the at least one battery pack is lowered into and lifted out of the charging station's at least one charging bay and the battery room's at least one battery bay, and that the transfer device comprises a lifting device for lowering and lifting a battery pack into and out of the at least one charging bay and the at least one battery bay.

16. The transport system according to claim 15, wherein the transfer device comprises a plurality of legs that are provided with wheels, the legs being designed such that the transfer device can be moved over the charging station and a battery pack can be lowered into and lifted out of the charging station's at least one charging bay.

17. The transport system according to claim 15, wherein the transfer device further comprises a winch device for lifting and lowering a battery pack.

18. The transport system according to claim 1, wherein the transfer device, the charging station and the vessel's battery room are provided with wheels or roller conveyors on which the at least one battery pack can roll.

19. The transport system according to claim 1, wherein the battery packs comprise a plurality of wheels arranged on the underside of the battery packs, and wherein the transport system is configured such that the battery packs can be rolled from the charging station's at least one charging bay onto the transfer device and from the transfer device into the battery room's at least one battery bay, and the other way from the at least one battery bay onto the transfer device and then into the at least one charging bay.

20. The transport system according to claim 1, wherein the at least one charging bay, the at least one battery bay and the transfer device are provided with at least one guiding device to guide the movement of the at least one battery pack into the at least one charging bay, into the at least one battery bay and onto the transfer device.

21. The transport system according to claim 1, wherein the transport system further comprises a control system with a control unit that communicates with a GPS system, the charging station, the transfer unit and the battery room so as to allow the charging station and/or the transfer unit and/or the battery room to be prepared for changing the vessel's at least one battery pack as the vessel approaches the charging station.

22. A ferry comprising a transport system according to claim 1.

23. A method for near-continuous operation of an electrically powered vessel, comprising:
providing a seagoing vessel comprising a battery room with space for at least one swappable battery pack, wherein the battery room comprises at least one battery bay for securely holding the at least one battery pack;
positioning the vessel close to a charging station for charging battery packs, the charging station having space for at least one battery pack, wherein the charging station comprises at least one charging bay for securely holding the at least one battery pack;
positioning a transfer device between the vessel's battery room and the charging station;
transferring the depleted or partly depleted battery pack from the vessel's battery room to the charging station by moving a lifting arm such that the lifting arm moves the depleted or partly depleted batter pack from a position over the at least one battery bay to a position over the at least one charging bay; and
transferring a charged battery pack from the charging station to the battery room for operation of the vessel by moving the lifting arm such that the lifting arm moves the charged batter pack from the position over the at least one charging bay to the position over the at least one battery bay.

24. The method according to claim 23, wherein the seagoing vessel is a ferry.

* * * * *

UNITED STATES PATENT AND TRADEMARK OFFICE
CERTIFICATE OF CORRECTION

| | |
|---|---|
| PATENT NO. | : 11,479,332 B2 |
| APPLICATION NO. | : 16/347452 |
| DATED | : October 25, 2022 |
| INVENTOR(S) | : Christian Sovik |

It is certified that error appears in the above-identified patent and that said Letters Patent is hereby corrected as shown below:

In the Specification

Column 1, Line 7, delete "35." and insert -- 35 --.

Column 15, Line 59, delete "that that" and insert -- that --.

In the Claims

Column 18, Line 50, In Claim 23, delete "batter" and insert -- battery --.

Column 18, Line 56, In Claim 23, delete "batter" and insert -- battery --.

Signed and Sealed this
Seventh Day of February, 2023

Katherine Kelly Vidal
*Director of the United States Patent and Trademark Office*